United States Patent

Ross

(10) Patent No.: US 8,808,132 B2
(45) Date of Patent: Aug. 19, 2014

(54) DIFFERENTIAL WITH INTEGRATED TORQUE VECTORING

(75) Inventor: Craig S. Ross, Ypsilanti, MI (US)

(73) Assignee: GM Global Technology Operations, LLC, Detroit, MI (US)

(*) Notice: Subject to any disclaimer, the term of this patent is extended or adjusted under 35 U.S.C. 154(b) by 107 days.

(21) Appl. No.: 13/485,233

(22) Filed: May 31, 2012

(65) Prior Publication Data

US 2013/0324348 A1    Dec. 5, 2013

(51) Int. Cl.
*F16H 48/285* (2012.01)
*F16H 3/60* (2006.01)
*F16H 48/30* (2012.01)

(52) U.S. Cl.
USPC ........... 475/252; 475/290; 475/319; 475/320; 475/150

(58) Field of Classification Search
USPC ......... 475/150, 154, 249, 252, 290, 295, 319, 475/320
See application file for complete search history.

(56) References Cited

U.S. PATENT DOCUMENTS

| | | | | |
|---|---|---|---|---|
| 1,508,885 | A * | 9/1924 | Jennings | 475/290 |
| 5,366,422 | A * | 11/1994 | Dye et al. | 475/249 |
| 6,325,736 | B1 * | 12/2001 | Hamada et al. | 475/18 |
| 6,409,622 | B1 * | 6/2002 | Bolz et al. | 475/5 |
| 7,128,680 | B2 * | 10/2006 | Holmes | 475/204 |
| 7,258,187 | B2 * | 8/2007 | Bowen | 180/248 |
| 2006/0270514 | A1 * | 11/2006 | Oguri et al. | 475/275 |

* cited by examiner

*Primary Examiner* — Roger Pang

(57) ABSTRACT

A torque vectoring differential includes a pair of planetary gear assemblies having a common planet gear carrier which is driven from the output of a transmission. Each of the planetary gear assemblies include a ring gear that may be individually and selectively grounded (braked) to a stationary housing by a friction brake and a sun gear that is coupled through an axle to a respective drive wheel. Selective activation of the brakes controls the distribution, i.e., vectoring, of torque to each of the drive wheels. Each planetary gear assembly includes elongated planet gears which mesh not only with their respective sun and ring gears but also with the planet gears of the other planetary gear assembly.

19 Claims, 2 Drawing Sheets

DIFFERENTIAL WITH INTEGRATED TORQUE VECTORING

FIELD

The present disclosure relates to differentials for motor vehicles and more particularly to differentials for motor vehicles having integrated torque vectoring.

BACKGROUND

The statements in this section merely provide background information related to the present disclosure and may or may not constitute prior art.

In recent years, motor vehicles, especially passenger cars and light trucks, have been the subject of intense effort to improve handling performance in both routine and emergency driving conditions. While the emphasis has been on the latter, it has been accompanied by the realization that aggressive, active control systems can prevent a routine or substantially routine driving condition from escalating into an emergency situation.

Accordingly, traction control and torque distribution powertrain systems have been developed concurrently with antilock brake systems (ABS) and other vehicular safety systems. Generally speaking, traction control and torque distribution powertrain systems encompass controlled mechanical, electro-mechanical or hydro-mechanical systems which control both the generation of torque by controlling operational aspects of the prime mover or the distribution of torque to the two or four driving wheels of the vehicle by controlling transmission, transfer case and differential components.

SUMMARY

The present invention provides a differential for a motor vehicle powertrain having integrated torque vectoring. The differential of the present invention provides vehicle handling enhancement in vehicle systems often referred to as stability control systems. The differential of the present invention includes a pair of side-by-side planetary gear assemblies having a common planet gear carrier which is driven by the output of a transmission. Each of the planetary gear assemblies include a ring gear that may be individually and selectively grounded (braked) to a stationary differential housing by a respective friction brake and a sun gear that is coupled through an axle to a respective drive wheel. Each planetary gear assembly includes elongated planet gears which mesh not only with their respective sun and ring gears but also with the planet gears of the other planetary gear assembly. Selective activation of the brakes controls the distribution, i.e., vectoring, of torque to each of the drive wheels. The differential also includes an optional limited slip clutch disposed between a sun gear and a ring gear of one of the planetary gear assemblies.

Thus it is an aspect of the present invention to provide a torque vectoring differential having a pair of planetary gear assemblies disposed side-by-side.

It is a further aspect of the present invention to provide a torque vectoring differential having a pair of independently operable brakes operably disposed between a respective ring gear of the pair of planetary gear assemblies and ground.

It is a still further aspect of the present invention to provide a torque vectoring differential having elongated planet gears which mesh not only with their associated sun and ring gears but also with the planet gears of the other planetary gear assembly.

It is a still further aspect of the present invention to provide a torque vectoring differential having an optional clutch disposed between the ring and sun gears of a planetary gear assembly for limiting slip of the differential.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
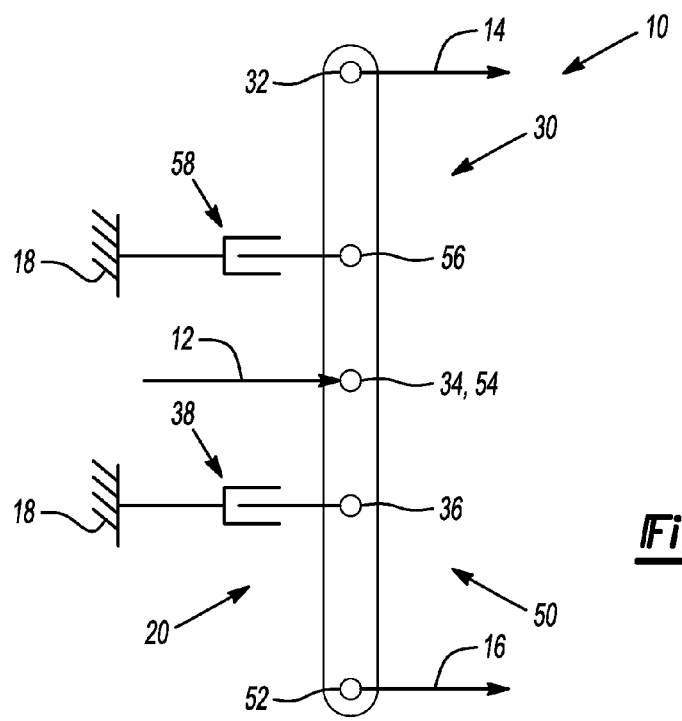
FIG. 1 is a lever diagram of a torque vectoring differential according to the present invention.

With reference now to FIG. 1, a torque vectoring differential for a motor vehicle according to the present invention is illustrated in a lever diagram and designated by the reference number 10. A lever diagram is a schematic representation of the components of a device such as a differential or an automatic transmission wherein a planetary gear assembly is represented by a vertical bar or lever and the components of the planetary gear assembly such as the sun gear, the planet gear carrier and the ring gear are represented by nodes. The relative lengths of the vertical bars between the nodes represent the ratios between the components. Mechanical couplings or interconnections between the nodes such as shafts or quills are represented by horizontal lines and torque transmitting devices such as friction clutches and brakes are represented by interleaved or nested fingers. Further explanation of the format, purpose and use of lever diagrams can be found in SAE Paper No. 810102 entitled, "The Lever Analogy: A New Tool in Transmission Analysis" by Benford and Leising which is fully incorporated herein by reference.

The torque vectoring differential 10 includes an input shaft 12, a first or left output half shaft or axle 14, a second or right output half shaft or axle 16 and a stationary housing 18 which is referred to in reference to FIG. 1 as ground. The single five node lever 20 represents two planetary gear assemblies 30 and 50. A first or left planetary gear assembly 30 includes a first node 32 which is connected to and drives the first or left output half shaft or axle 14, a second node 34 which is connected to and driven by the input shaft 12 and a third node 36. A second or right planetary gear assembly 50 includes a first node 52 which is connected to and drives the second or right output half shaft or axle 16, a second node 54 which is common with the second node 34 of the first planetary gear assembly 30 and which is connected to and driven by the input shaft 12 and a third node 56.

The third node 36 of the first or left planetary gear assembly 30 is coupled to one side, for example an input side, of a first or left friction brake assembly 38 and the other side of the first or left friction brake assembly 38 is connected to ground 18.

The third node 56 of the second or right planetary gear assembly 50 is coupled to one side, for example an input side, of a second or right friction brake assembly 58 and the other side of the second or right friction brake assembly 58 is connected to ground 18.

Figure 2:
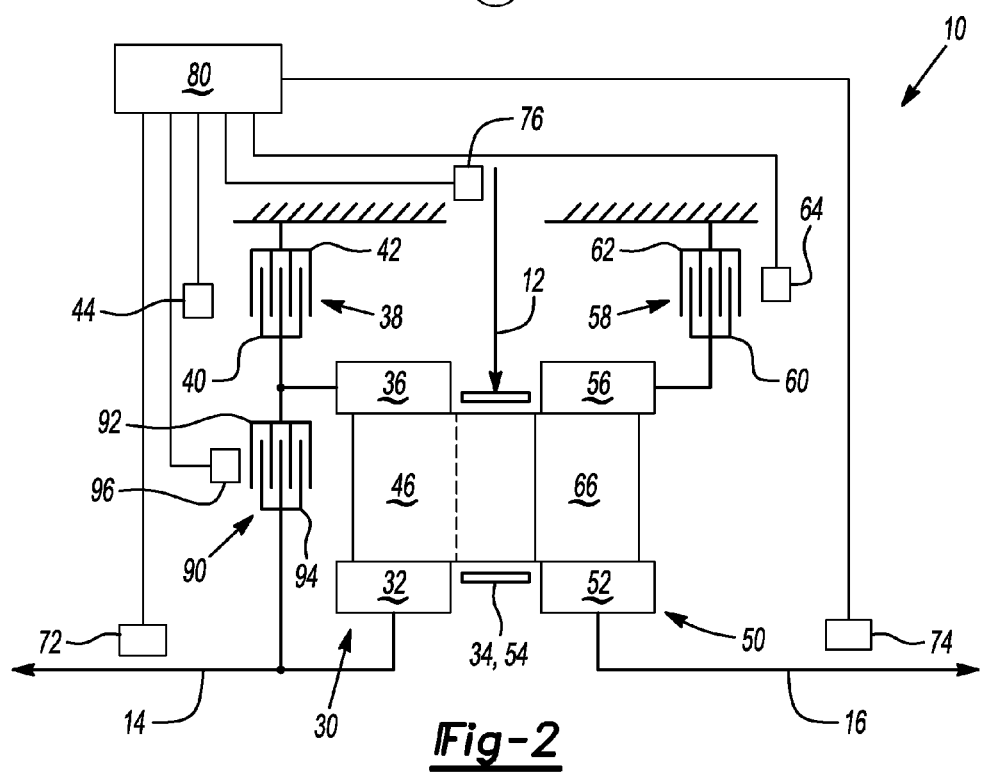
FIG. 2 is a diagrammatic view of a torque vectoring differential according to the present invention and associated components of a motor vehicle.
Figure 3:
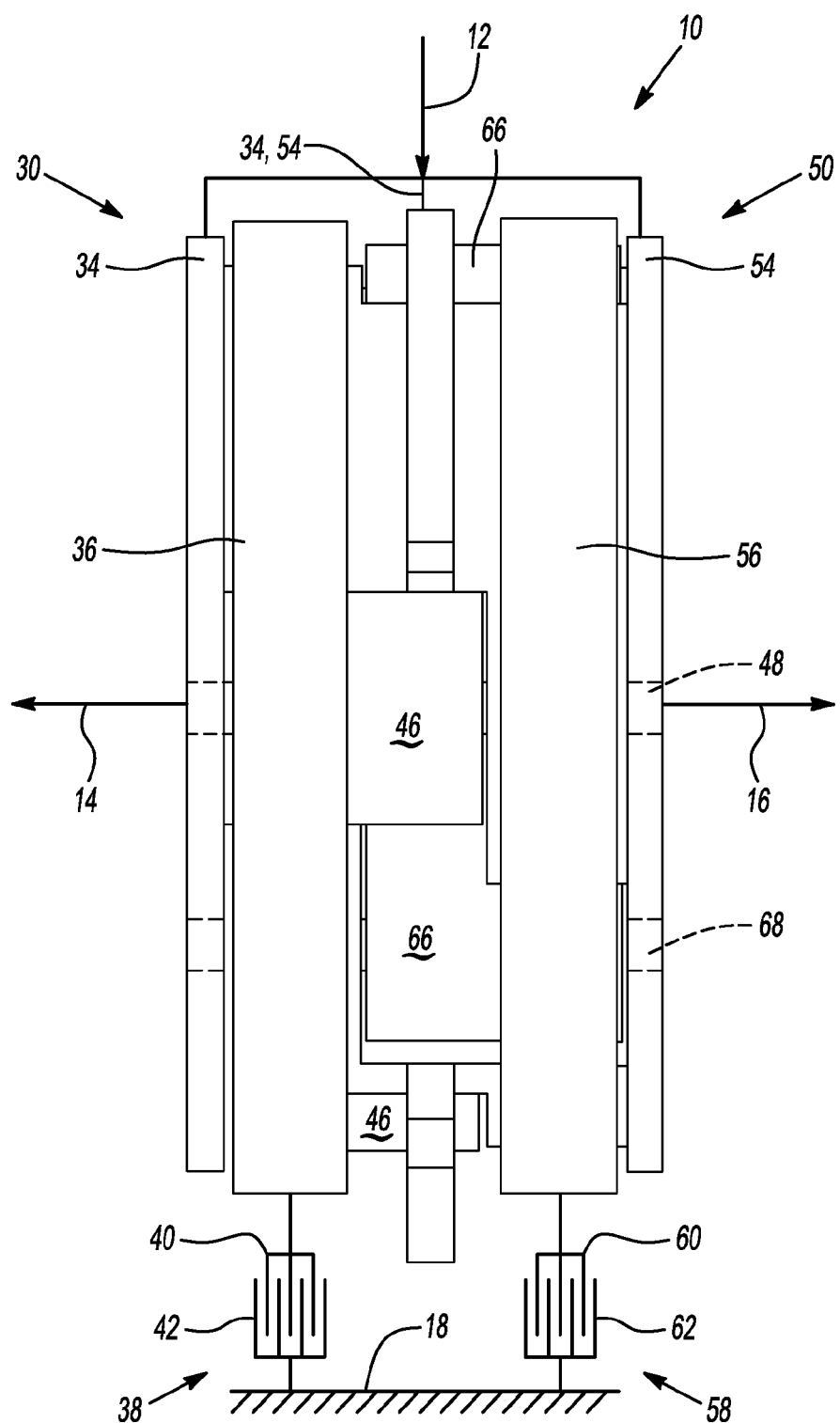
FIG. 3 is a side elevational view of the planetary gear assemblies of a torque vectoring differential according to the present invention.

Referring now to FIGS. 2 and 3, the torque vectoring differential 10 includes the input shaft 12 which is connected to and drives a common planet gear carrier 34, 54. The first or left output half shaft or axle 14 is coupled to and driven by a first or left sun gear 32 of the first of left planetary gear assembly 30 and the second or right output half shaft or axle 16 is coupled to and driven by a second or right sun gear 52 of the second or right planetary gear assembly 50. The first or left planetary gear assembly 30 also includes a first or left ring gear 36 which is connected to the input side of the first or left friction brake assembly 38 having a plurality of input friction plates or discs 40. Interleaved with the plurality of input plates or discs 40 and connected to ground or the housing 18 are a plurality of stationary or ground plates or discs 42. A first or left operator or actuator 44 is disposed in proximate, operable relationship to the interleaved plates or discs 40 and 42. The first of left operator or actuator 44 is preferably hydraulic but may be electric or pneumatic.

The second or right planetary gear assembly 50 also includes a second or right ring gear 56 which is connected to the input side of the second friction brake assembly 58 having a plurality of input friction plates or discs 60. Interleaved with the plurality of input plates or discs 60 and connected to ground or the housing 18 are a plurality of stationary or ground plates or discs 62. A second or right operator or actuator 64 is disposed in proximate, operable relationship to the interleaved plates or discs 60 and 62. The second or right operator or actuator 64 is also preferably hydraulic but may be electric or pneumatic.

Alternatively, certain connections to the first planetary gear assembly 30 and the second planetary gear assembly 50 may be reversed, with first or left output half shaft or axle 14 connected to the first or left ring gear 36, the first or left friction brake assembly 38 connected to the first or left sun gear 32, the second or right output half shaft or axle 16 connected to the second or right ring gear 56 and the second friction brake assembly 58 connected to the second or right sun gear 52.

Disposed within the common planet gear carrier 34, 54 are a first plurality, typically three, of left planet gears 46 which are rotatably disposed on a like plurality of stub shafts 48. If desired, needle or roller bearing assemblies (not illustrated) may be located between the planet gears 46 and the stub shafts 48 to reduce friction and spin losses. The first plurality of left planet gears 46 are in constant mesh with the first or left sun gear 32 and the first or left ring gear 36. The first plurality of left planet gears 46 are elongated as best illustrated in FIG. 3 and are also on constant mesh with a respective one of a second plurality of right planet gears 66 which are also elongated and rotatably disposed on stub shafts 68 in the common carrier 34, 54. Again. If desired, needle or roller bearings (not illustrated) may be located between the planet gears 66 and the stub shafts 68. In addition to meshing with the first plurality of left planet gears 46, the second plurality of right planet gears 66 are in constant mesh with the second or right sun gear 52 and the second or right ring gear 56.

It should be appreciated and understood that the various corresponding components of the first or left planetary gear assembly 30 and the second or right planetary gear assembly 50, that is the sun gears 32 and 52, the planet gears 46 and 66 and the ring gears 36 and 56 are the identical size and include the same size, pitch and number of teeth such that an even and equal torque split and delivery to the left and right axles or half shafts 14 and 16 occurs when the left and right friction brake assemblies 38 and 58 are fully released.

Several associated components cooperate with the torque vectoring differential 10 and are illustrated in FIG. 2. Disposed in sensing relationship with the first or left output half shaft or axle 14 is a first or left speed sensor assembly 72 and similarly disposed with the second or right output half shaft or axle 16 is a second or right speed sensor assembly 74. The speed of the input shaft 12 will generally be provided by an output speed sensor in the vehicle transmission (not illustrated) but, if desired, a dedicated input speed sensor assembly 76 may be disposed in sensing relationship with the input shaft 12. Preferably, the speed sensor assemblies 72, 74 and 76 are Hall effect sensors although other sensor types such as optical or variable reluctance sensors may be utilized. The outputs of the speed sensor assemblies 72, 74 and 76 are provided to a control module 80 such as a chassis control module (CCM) or similar device. The control module 80 typically includes, for example, input devices, one or more microprocessors, storage, look up tables and output devices that control the first or left brake operator or actuator 44, the second or right brake operator or actuator 64 and a limited slip clutch operator 96 as described directly below.

The torque vectoring differential 10 also optionally includes a controlled or modulating limited slip clutch 90. The limited slip clutch 90 includes a first plurality of friction plates or discs 92 that are connected to the first or left ring gear 36 of the first or left planetary gear assembly 30 and a second plurality of friction plates or discs 94 are interleaved with the first plurality of plates or discs 92 and connected to the first or left sun gear 32 of the first or left planetary gear assembly 30 (and/or the first or left output shaft 14). The limited slip clutch 90 also includes a third hydraulic, electric or pneumatic operator or actuator 96 which is preferably under the control of the control module 80.

Briefly, in operation, the brake assemblies 38 and 58 of the torque vectoring differential 10 may be partially or fully engaged to partially or fully inhibit differentiation by the pair of planetary gear assemblies 30 and 50 and direct more or less torque to one or the other of the axles or half shafts 14 and 16. The limited slip clutch 90 may be partially of fully engaged to partially or fully inhibit differentiation by the pair of planetary gear assemblies 30 and 50.

The description of the invention is merely exemplary in nature and variations that do not depart from the gist of the invention are intended to be within the scope of the invention. Such variations are not to be regarded as a departure from the spirit and scope of the invention.

What is claimed is:

1. A torque vectoring differential comprising, in combination,
    an input member, a first output member, a second output member, a first brake, a clutch, a second brake,
    a first planetary gear assembly having a first gear coupled directly to said first output member, a second gear coupled to said first brake, said clutch operably disposed between said first gear and said second gear of said first planetary gear assembly and a first planet gear carrier coupled to said input member and having a first plurality of planet gears meshing with said first and said second gears of said first planetary gear assembly, and
    a second planetary gear assembly having a first gear coupled directly to said second output member, a second gear coupled to said second brake and a second planet gear carrier coupled to said input member and having a second plurality of planet gears meshing with said first and said second gears of said second planetary gear assembly and said first plurality of planet gears.

2. The torque vectoring differential of claim 1 wherein said first gear of said first planetary gear assembly is a sun gear, said second gear of said first planetary gear assembly is a ring gear, said first gear of said second planetary gear assembly is a sun gear and said second gear of said second planetary gear assembly is a ring gear.

3. The torque vectoring differential of claim 1 further including a housing and wherein said first brake and said second brake are coupled to said housing.

4. The torque vectoring differential of claim 1 further including a first speed sensor associated with said first output member, a second speed sensor associated with said second output member and a control module for receiving signals from said first and said second sensors.

5. A torque vectoring differential comprising, in combination,
an input member, a first output member and a second output member,
a first planetary gear assembly having a first sun gear coupled to said first output member, a first ring gear, and a first planet gear carrier coupled to said input member and having a first plurality of planet gears meshing with said first sun gear and said first ring gear,
a second planetary gear assembly having a second sun gear coupled to said second output member, a second ring gear, and a second planet gear carrier coupled to said input member and having a second plurality of planet gears meshing with said second sun gear, said second ring gear and said first plurality of planet gears,
a first brake operably disposed between said first ring gear and ground, and
a second brake operably disposed between said second ring gear and said ground.

6. The torque vectoring differential of claim 5 further including a clutch operably disposed between said first ring gear and said first sun gear.

7. The torque vectoring differential of claim 5 further including a first speed sensor associated with said first output member and a second speed sensor associated with said second output member.

8. The torque vectoring differential of claim 5 further including a first speed sensor associated with said first output member, a second speed sensor associated with said second output member and a control module for receiving signals from said sensors.

9. The torque vectoring differential of claim 5 further including a first operator associated with said first brake and a second operator associated with said second brake.

10. The torque vectoring differential of claim 9 further including a first speed sensor associated with said first output member, a second speed sensor associated with said second output member and a control module for receiving signals from said sensors and controlling said hydraulic operators.

11. The torque vectoring differential of claim 5 further including a speed sensor associated with said input member and wherein said output members are axles.

12. The torque vectoring differential of claim 5 wherein said first planet gear carrier and said second planet gear carrier are a unitary component and all said planet gears are rotatably disposed in said unitary component.

13. A torque vectoring differential comprising, in combination,
a housing,
an input member, a first output member and a second output member,
a first planetary gear assembly having a first sun gear coupled to said first output member, a first ring gear and a first planet gear carrier coupled to said input member and having a first plurality of planet gears meshing with said first sun gear and said first ring gear,
a second planetary gear assembly having a second sun gear coupled to said second output member, a second ring gear and a second planet gear carrier coupled to said input member and having a second plurality of planet gears meshing with said second sun gear, said second ring gear and said first plurality of planet gears,
a first brake operably disposed between said first ring gear and said housing, and
a second brake operably disposed between said second ring gear and said housing.

14. The torque vectoring differential of claim 13 wherein said sun gear, said ring gear and said planet gears of said first planetary gear assembly are the same diameter and pitch as the corresponding said sun gear, said ring gear and said planet gears of said second planetary gear assembly.

15. The torque vectoring differential of claim 13 further including a slip limiting clutch operably disposed between said first ring gear and said first sun gear.

16. The torque vectoring differential of claim 13 further including a first speed sensor associated with said first output member, a second speed sensor associated with said second output member, a third speed sensor associated with said input member and a control module for receiving signals from said sensors.

17. The torque vectoring differential of claim 13 further including a first hydraulic operator associated with said first brake and a second hydraulic operator associated with said second brake.

18. The torque vectoring differential of claim 13 further including a first speed sensor associated with said first output member, a second speed sensor associated with said second output member and a control module for receiving signals from said sensors and controlling said hydraulic operators.

19. The torque vectoring differential of claim 13 wherein said first planet gear carrier and said second planet gear carrier are a unitary component and all said planet gears are rotatably disposed in said unitary component.

* * * * *